2 Sheets—Sheet 1.

L. TOWNSEND,

Assignor to C. GUILD.

Leather Boarding and Graining Machine.

No. 8,088. Reissued Feb. 19, 1878.

WITNESSES

*Nat. E. Oliphant*

*H. B. Walker*

INVENTOR

*Louis Townsend.*

*per Chas. H. Fowler.*

*Attorney.*

THE NORRIS PETERS CO., PHOTO-LITHO., WASHINGTON, D. C.

2 Sheets—Sheet 2.

L. TOWNSEND,

Assignor to C. GUILD.

Leather Boarding and Graining Machine.

No. 8,088. Reissued Feb. 19, 1878.

WITNESSES

Nat. S. Oliphant.

H. B. Walker

INVENTOR

Louis Townsend, per Chas. H. Fowler.

Attorney.

THE NORRIS PETERS CO., PHOTO-LITHO., WASHINGTON, D. C.

UNITED STATES PATENT OFFICE.

LOUIS TOWNSEND, OF TERRE HAUTE, INDIANA, ASSIGNOR TO CHESTER GUILD, OF BOSTON, MASSACHUSETTS.

IMPROVEMENT IN LEATHER BOARDING AND GRAINING MACHINES.

Specification forming part of Letters Patent No. 126,105, dated April 23, 1872; Reissue No. 8,088, dated February 19, 1878; application filed November 7, 1877.

*To all whom it may concern:*

Be it known that I, LOUIS TOWNSEND, of Terre Haute, in the county of Vigo and State of Indiana, have invented a new and useful Improvement in Machines for Boarding, Graining, and Softening Leather; and I do hereby declare that the following is a full, clear, and exact description of the same, reference being had to the accompanying drawings, in which—

Figure 1:
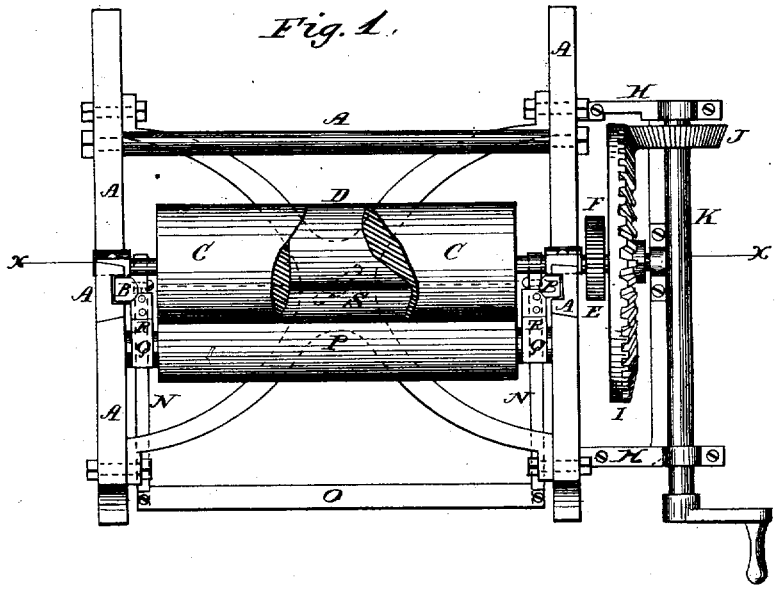
Figure 2:
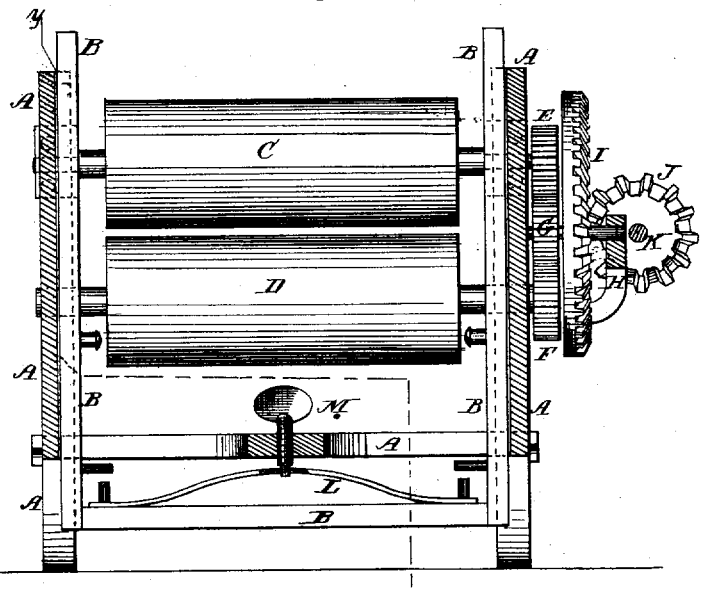
Figure 3:
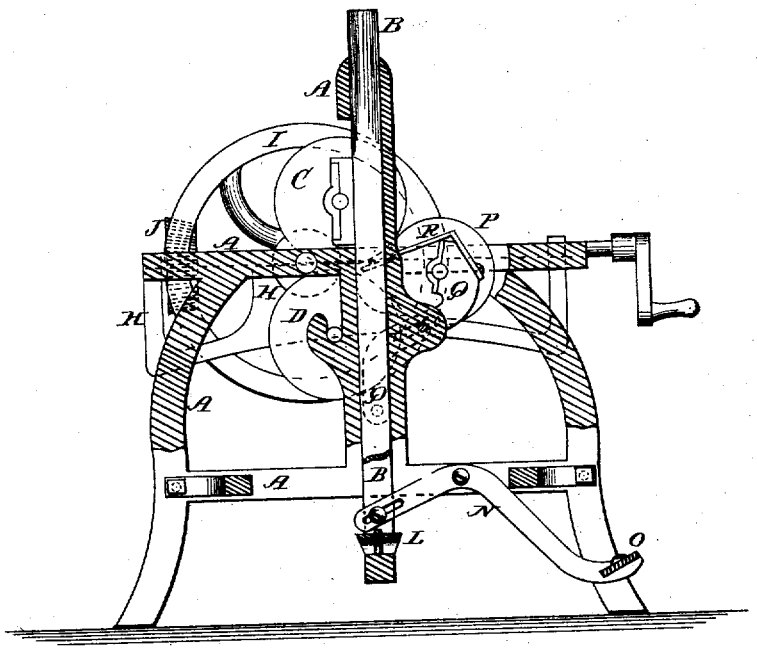

Figure 1 is a top view of my improved machine, part of the upper roller being broken away to show the construction. Fig. 2 is a detail vertical section of the same, taken through the line *x x* of Fig. 1. Fig. 3 is a detail sectional view of the same, taken through the line *y y* of Fig. 1.

Similar letters of reference indicate corresponding parts.

My invention has for its object to furnish an improved machine for boarding, graining, and softening leather, which shall be simple in construction, convenient in use, and effective in operation, doing its work quicker and better than it can be done by hand, and with substantially the effect of hand-boarding upon leather.

My invention consists, in such a machine, of an adjustable plate or blade, the same being adjusted by mechanism to admit of the plate or blade being brought in the desired position between the boarding-rollers.

My invention further consists, in connection with an upper boarding-roller and a lower boarding-roller, of a plate or blade, said upper roller, and the plate or blade being connected with an arrangement of levers or mechanism, whereby the two may be simultaneously adjusted with relation to each other.

My invention also consists of a plate or blade, having connected thereto pivoted arms or levers, in combination with a foot lever or treadle and a suitable intermediate lever, whereby the operator is enabled to bring the plate or blade in the desired position between the boarding-rollers.

My invention also consists, in connection with suitable boarding-rollers, and an adjustable plate or blade, of a feeding-roller for the purpose of holding the leather firmly against the boarding-rollers during the operation.

My invention also consists in the employment of a spring and a means for regulating the tension of the same, by which the upper boarding-roller is capable of being adjusted to or held down upon the lower boarding-roller.

My invention further consists of the arrangement of gearing, as will be hereinafter more fully set forth.

In the drawings, A represents the frame of the machine, the central end posts of which are grooved or channeled longitudinally upon their inner sides to receive the frame composed of the bars B, which slide up and down in said grooves, and to the upper part of which are attached the bearings in which the journals of the upper boarding and graining roller C revolve. D is the lower boarding and graining roller, its journals revolving in stationary bearings formed upon or attached to the frame A. The rollers C D should be covered with fine emery, to enable them to take hold of the leather to be operated upon.

To the projecting journals of the rollers C D, at one side of the machine, are attached gear-wheels E F, the teeth of which mesh into the teeth of the intermediate gear-wheel G, the journals of which revolve in bearings in the frame A, and in a bracket, H, attached to said frame.

To the journals of the intermediate gear-wheel G is attached a large bevel-gear wheel, I, which serves as a fly-wheel, and the teeth of which mesh into teeth of a small bevel-gear wheel, J, attached to the shaft K, and which revolves in brackets attached to the frame A, and to which motion is given from any convenient power by a crank or pulley in the ordinary manner. By this construction the upper roller C can be raised for the convenient insertion of the leather without disarranging the gearing.

The frame B is held down, to hold the upper roller C down upon the roller D, by a spring, L, resting upon the bottom bar of said frame B, and presses against the lower cross-bar of the frame A. The tension of the spring L is regulated by a set-screw, M, which passes through the said cross-bars of the frame A, and bears against the spring L.

N are levers, the outer ends of which are connected by a cross-bar, O, which serves as a foot-lever or treadle for operating said levers. The inner ends of the levers N are pivoted to the lower parts of the frame B by bolts or screws which pass through slots or elongated holes in the said levers and into the frame B. The levers N are pivoted to the frame A by bolts or screws which pass through holes in the said levers and frame.

P is a roller, made somewhat smaller than the rollers C D, so as to enter the space between the forward sides of said rollers and hold the leather firmly against them. The journals of the roller P revolve in bearings in the outer ends of the levers Q, which are pivoted to the frame A by bolts or screws passing through short slots in the levers Q and into the said frame B. By this construction, as the frame B and upper roller C are raised, the levers Q are operated to throw back the roller P to allow the leather to be conveniently introduced.

A plate or blade, S, over which the leather is folded, is connected to the levers Q by arms R, and is connected to the frame B by the levers Q, in such a manner that will admit of its being swung in position between the rollers C D, to bring the fold of the leather, at or near the center, between said rollers.

It will be seen that both the upper boarding-roller and the plate or blade are so connected with the arms B that when pressure is brought upon the outer ends of the levers N, or upon the cross-bars O, the upper roller C will be raised simultaneously with the adjustment of the plate or blade, which is thrown back to admit of the insertion of a fresh side of the leather to be operated upon, thereby making the roller and plate or blade simultaneously adjustable with relation to each other.

In using the machine the outer ends of the levers N are pressed down by the treadle O, which raises the frame B and upper roller C, and operates the lever Q to throw back the roller P and plate or blade S. The leather is then folded over the front edge of the plate or blade, and as the weight is released from the treadle O the spring L forces the frame B and roller C down, which operates the levers Q to throw the plate or blade S and roller P forward, the plate or blade S and the roller P holding it firmly between the rollers C D. If, now, the machine is started, the rollers D P will draw the leather inward and the rollers C P will draw it outward, while the plate or blade S will keep it doubled or folded, and press it between the rollers C D, the fold of the leather constantly changing its place, and the same effect being produced as is produced by hand boarding and graining, and doing it quicker and better and more uniformly.

Having now fully described the construction and operation of my invention, what I claim, and desire to secure by Letters Patent, is—

1. In a machine for boarding, graining, and softening leather, an adjustable plate or blade, over the edge of which the leather to be boarded is folded and moved, said plate or blade being adjusted by mechanism, substantially as and for the purpose set forth.

2. In a machine for boarding, graining, and softening leather, the combination, with upper and lower boarding-rollers, of a plate or blade over which the leather is folded, said upper roller and plate or blade adapted to be adjusted simultaneously and with relation to each other, substantially as and for the purpose described.

3. In a machine for boarding, graining, and softening leather, a plate or blade, in combination with pivoted arms or levers, an intermediate lever, and a foot-lever or treadle, whereby the operator is enabled to adjust said plate or blade in relation to the boarding rollers or cylinders, substantially as and for the purpose set forth.

4. The combination, with suitable boarding-rollers and an adjustable plate or blade, of a feeding-roller, for the purpose of holding the leather against the boarding-rollers, substantially as specified.

5. The spring L and set-screw M, for the purpose of holding the upper roller C against the lower roller D, as set forth.

6. The shaft K, bevel-gear wheels I J, gear-wheels E F, and intermediate gear-wheel G, combined to operate substantially as and for the purpose specified.

7. The frame A, the central end posts of which are grooved longitudinally upon their inner sides to receive the frame B and the slotted levers N and Q, plate or blade S, and rollers C D P, combined to operate substantially as and for the purpose specified.

In testimony that I claim the above I have hereunto subscribed my name in the presence of two witnesses.

LOUIS TOWNSEND.

Witnesses:
JAMES D. BROWN,
HENRY H. BOUDINOT.